United States Patent
Gacka et al.

(10) Patent No.: US 12,358,498 B1
(45) Date of Patent: Jul. 15, 2025

(54) REAR END COLLISION PROBABILITY CALCULATION

(71) Applicant: Zoox, Inc., Foster City, CA (US)

(72) Inventors: Thomas Bernard Gacka, Redwood City, CA (US); Nicolas Roman Hammer, Saratoga, CA (US); Leonardo Poubel Orenstein, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 227 days.

(21) Appl. No.: 17/700,849

(22) Filed: Mar. 22, 2022

(51) Int. Cl.
  *B60W 30/095* (2012.01)
  *B60W 30/085* (2012.01)
  *B60W 60/00* (2020.01)

(52) U.S. Cl.
  CPC ...... *B60W 30/0953* (2013.01); *B60W 30/085* (2013.01); *B60W 30/0956* (2013.01); *B60W 60/0016* (2020.02); *B60W 60/0017* (2020.02); *B60W 2554/4041* (2020.02); *B60W 2554/4049* (2020.02)

(58) Field of Classification Search
  CPC ........... B60W 30/0953; B60W 30/085; B60W 30/0956; B60W 60/0016; B60W 60/0017; B60W 2554/4041; B60W 2554/4049
  See application file for complete search history.

(56) References Cited

U.S. PATENT DOCUMENTS

| | | | | |
|---|---|---|---|---|
| 2009/0224942 | A1* | 9/2009 | Goudy | G08G 1/164 340/905 |
| 2017/0369055 | A1* | 12/2017 | Saigusa | G08G 1/096775 |
| 2018/0137754 | A1* | 5/2018 | Alon | G06V 20/54 |
| 2018/0345981 | A1* | 12/2018 | Ferguson | G07C 5/02 |
| 2019/0256090 | A1* | 8/2019 | Yoo | B60W 30/0956 |
| 2019/0308617 | A1* | 10/2019 | Groult | B60W 50/0098 |
| 2023/0011497 | A1* | 1/2023 | Engstrom | B60W 50/0097 |

OTHER PUBLICATIONS

Xu et al., "Modeling drivers' reaction when being tailgated: A Random Forests Method", 2021, National Safety Council, Journal of Safety Research (Year: 2021).*

* cited by examiner

Primary Examiner — Jason Holloway
Assistant Examiner — Elizabeth Rose Neleski
(74) Attorney, Agent, or Firm — Lee & Hayes, P.C.

(57) ABSTRACT

Techniques for determining a rear end collision probability for a vehicle are discussed herein. The rear end collision probability can be determined based on data associated with the vehicle and an object proximate the vehicle, probability distribution data, and a vehicle maneuver value. The probability distribution data, which can be received, may represent a reaction time of the object and a maneuver value of the object. The rear end collision probability can be utilized to control the vehicle.

20 Claims, 5 Drawing Sheets

REAR END COLLISION PROBABILITY CALCULATION

BACKGROUND

Modern vehicles utilize information about objects in various relative locations of an environment through which the vehicles travel. For example, various systems, such as vehicles, utilize data indicative of objects travelling behind, and in a same direction as, the vehicles. The data can be used for collision and obstacle avoidance. In order to effectively navigate the environment, such vehicles may use information about movement, physical characteristics, and/or locations of the obstacles. Often, performance of these systems is hampered due to determinations, such as estimations and/or predictions, associated with the objects being inaccurate or untimely.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
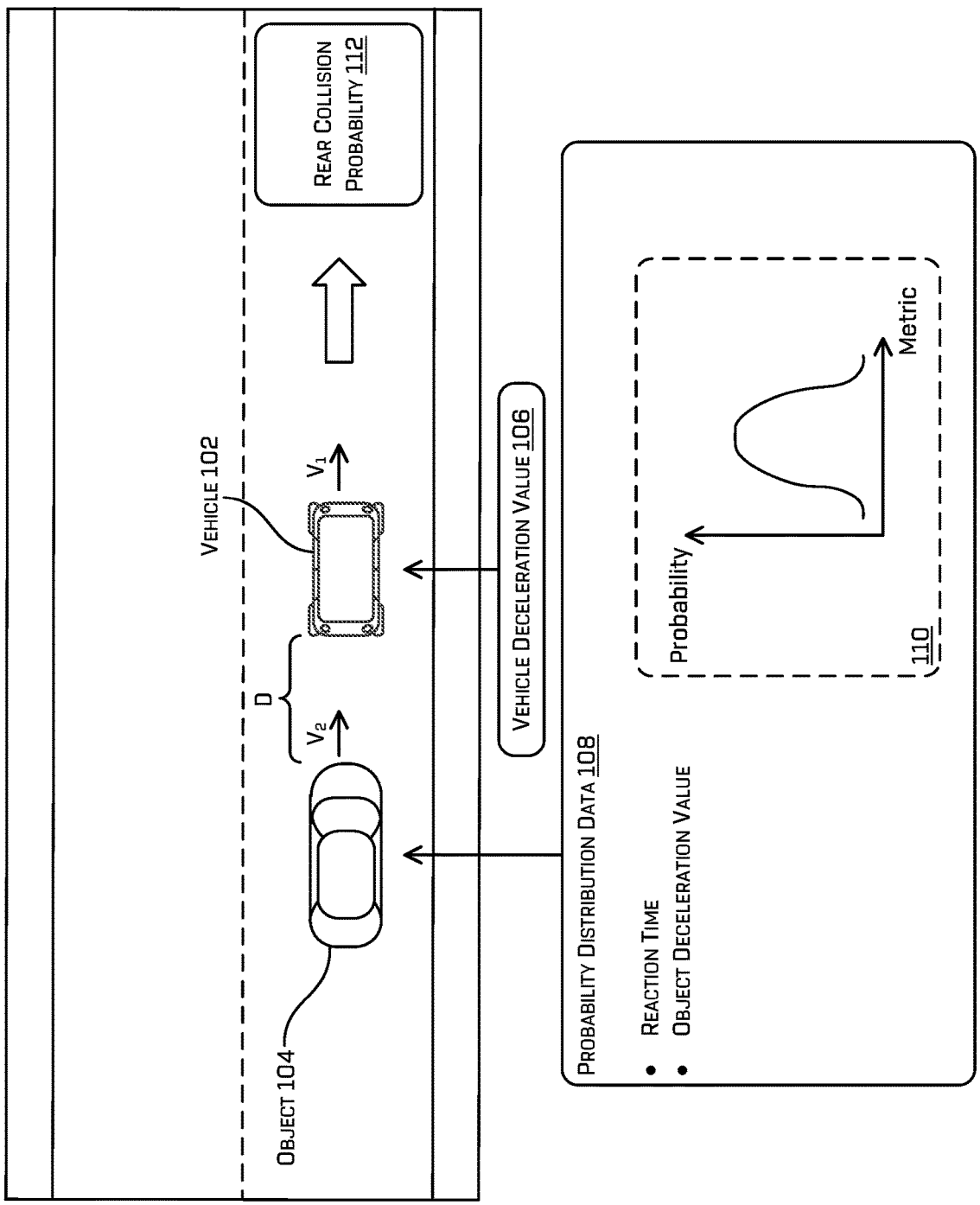
FIG. 1 is an example illustration of determining a rear end collision probability for a vehicle traversing through an environment, in accordance with examples of the disclosure.

This disclosure describes methods, apparatuses, and systems for utilizing rear end collision probability determinations to control vehicles. For example, data associated with a vehicle traversing an environment, and/or one or more objects proximate the vehicle, can be received. Vehicle data can be utilized to determine one or more regions proximate the vehicle. The vehicle data and object data can be utilized to determine an object in a region behind the vehicle. Probability distribution data representing object behavior can be received. The object behavior can include a reaction time of the object and/or a deceleration value of the object. The reaction time and/or the deceleration value can be utilized to determine a probability of the object colliding with a rear end of the vehicle. The vehicle can be controlled based on the probability.

Traditional systems associated with vehicles traversing through environments can provide various types of information about the vehicles, as well as objects, in the environments. Generally, the systems can capture data including one or more physical characteristics representing the vehicles and/or the objects, and/or determine data including one or more parameters associated with vehicle behavior and/or object behavior. Consolidating and processing the data associated with the vehicles and the objects may enable vehicle systems to determine likelihoods of collisions between the vehicles and the objects. However, limitations in the accuracy of the determined likelihoods may result in the vehicles being exposed to collisions with the objects. Exposure of the vehicles to collisions of certain types, particularly rear end collisions, may be relatively high due to unique complexities and uncertainties associated with behaviors of objects travelling behind vehicles. Additionally, implementing thresholds and limitations for controlling the vehicles in such a way as to avoid rear end collisions may result in undue delays and/or hazardous situations.

Such shortcomings of the traditional systems may be avoided, alleviated, and/or remedied by determining probabilities of rear end collisions of the vehicles, as will be described in detail below. The probabilities can be determined by analyzing a large collection of vehicle logs. The vehicle logs can be analyzed to determine metrics utilized to determine a likelihood that autonomous operation of the vehicle will result in the vehicle being rear ended. Controlling the vehicles based on the rear end collision probabilities may improve the safety and efficiency of vehicle operation.

Rear end collision probabilities may be determined utilizing probability distribution data. The probability distribution data can include one or more probabilities, such as reactivity probability(ies). For example, individual ones of the reactivity probability(ies) can be determined based on a corresponding object reaction time and/or a corresponding object deceleration value. A reaction time that is relatively higher may be utilized to represent a larger amount of time passing before an object begins to slow down after a vehicle begins slowing down, in comparison to a relatively lower reaction time. A deceleration value that is relatively higher may be utilized to represent a greater level of deceleration exhibited by the object that begins to slow down after the vehicle begins slowing down, in comparison to a relatively lower deceleration value.

In additional or alternative examples, other information of various types can be utilized to determine the rear end collision probabilities. In one example, the other information can include vehicle data associated with a vehicle in an environment, object data associated with an object proximate the vehicle, one or more parameters determined based on the vehicle data and/or the object data, and/or one or more vehicle metrics. The parameter(s) can include a region behind the vehicle, a distance between the vehicle and the object, a velocity difference between corresponding velocities of the vehicle and the object, a deceleration value associated with the vehicle braking, and/or an angular difference between directions of travel of the vehicle and the object. The vehicle metric(s) can include a distance metric representing the vehicle associated with a tailgated state, a distance metric representing a distance traveled by the vehicle, and/or a relative number representing a relative tailgating state metric.

In some examples, a tailgated state can represent a state in which an object (e.g., a vehicle) is following a vehicle (e.g., an autonomous vehicle). The state of the vehicle being followed can be determined as the tailgated state based on one or more movement parameters (e.g., velocities and/or decelerations) such that, if the vehicle were to stop, the object would collide with the vehicle. The movement parameter(s) associated with the state of the vehicle (e.g., the vehicle being followed) being determined as the tailgated state can include the relative velocities of the object and the vehicle, and/or expected deceleration values of the object and the vehicle. As can be understood, because the object may be associated with various reaction times and deceleration values, the tailgated state can be associated with a likelihood or probability, as discussed herein. Further, the probability of the vehicle (e.g., the autonomous vehicle) being in a tailgated state can be based at least in part on the deceleration of the vehicle, so the tailgated state can be a function of a selected or determined vehicle deceleration value.

In additional or alternative examples, log data associated with one or more vehicles traversing an environment can be utilized to determine rear end collision probabilities. The log data can be transmitted by, and received from, the vehicle(s). The log data can include vehicle data associated with the vehicle(s), and/or object data associated with one or more objects proximate the vehicle(s). In some examples, the log data can be utilized to determine the parameter(s) and/or the metric(s). In those examples, the log data can be updated to include the parameter(s) and/or the metric(s).

The techniques discussed herein can improve a functioning of a computing device in a number of ways. For example, probabilities of rear end collisions may be used by vehicle systems of various types, such as control systems, navigation systems, route or path planning systems, and the like. In some instances, information associated with vehicles being controlled based on rear end collision probabilities may be used to understand an operational space of a vehicle in view of surface and/or environmental conditions, faulty components, etc. As a non-limiting example for illustration, use of the rear end collision probabilities may inform a planner system of a vehicle not to exceed a given acceleration (e.g., deceleration) or velocity based on a number of objects in the environment and/or presence of precipitation, etc. The object(s) may include an object travelling behind the vehicle and/or an object travelling ahead of the vehicle.

Information associated with vehicles being controlled based on the rear end collision probabilities may also be used to capture and generate feedback for improving operations and designs of vehicles and vehicle software. For instance, in some examples, information associated with the vehicles being controlled based on the rear end collision probabilities may be useful for determining an amount of redundancy that is required in various components of the vehicle, or how to modify a behavior of the vehicle based on what is learned through the results of one or more simulations. Furthermore, in additional or alternative examples, information associated with the vehicles being controlled based on the rear end collision probabilities may be useful to improve the hardware design of the vehicles, such as optimizing placement of sensors with respect to a chassis or body of the autonomous vehicle.

Although the rear collision probabilities can be determined for the vehicles, as discussed above in the current disclosure, it is not limited as such. In some examples, any of the techniques as discussed herein can be implemented utilizing an autonomous vehicle as the vehicle. Although the rear collision probabilities can be determined based on the objects behind the vehicles, as discussed above in the current disclosure, it is not limited as such. In some examples, any of the techniques as discussed herein can be implemented utilizing a vehicle (e.g., an autonomous vehicle or a non-autonomous vehicle) as any of the objects.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any combination of the two.

FIG. 1 is an example illustration 100 of for determining a rear end collision probability for a vehicle traversing through an environment, in accordance with examples of the disclosure. As illustrated, a vehicle 102 and an object 104 (e.g., also referred to as an external vehicle) can be traversing through an environment. In some examples, the vehicle 102 can capture sensor data via one or more sensors, which may be, for example, RGB cameras, intensity/grey scale cameras, depth cameras, time of flight cameras, infrared cameras, RGB-D cameras, and the like. Of course, the vehicle 102 can include any number and/or any type of sensors oriented in any directions on the vehicle 102. For example, the vehicle 102 can include sensors including, but not limited to, one or more of LIDAR (light detection and ranging) sensors, radar sensors, sonar sensors, wheel encoders, inertial measurement units (IMUs) (which can include gyroscopes, magnetometers, accelerometers, etc.), GPS sensors, image sensors, and the like.

The sensor data captured by the vehicle 102 can include data associated with the vehicle and/or the object. For example, the sensor data can include vehicle data and/or object data. The vehicle data can include a representation of, and/or one or more physical characteristics (e.g., a size, a shape, etc.) associated with, the vehicle 102. The object data can include a representation of, and/or one or more physical characteristics (e.g., a size, a shape, etc.) associated with, the object 104. The sensor data can include location data (e.g., GPS location data) of the vehicle 102 and/or the object 104. The location data can include one or more of a location (e.g., first location) of the vehicle 102 and/or a location (e.g., second location) of the object 104. The sensor data can include any amount of data respectively captured at points in time, which can include any number of points in time.

The sensor data can be utilized to define one or more regions surrounding the vehicle 102. In some cases, the region(s), which can include a region behind the vehicle 102, can be defined based on lanes designations within the environment and relative to the position of the vehicle 102. In some examples, decisions and reactions of the vehicle 102 to events and situations that the vehicle 102 can encounter can be modeled and simulated. As an example, details associated with defining regions, and utilizing scenarios to model and simulate the vehicle decisions and reactions, may be discussed in U.S. application Ser. No. 16/866,715, which is herein incorporated by reference in its entirety and for all purposes.

Data that includes one or more parameters associated with behavior of the vehicle 102 and/or the object 104 can be determined based on the sensor data. The parameter(s) associated with the vehicle 102 can include the region(s), which can be utilized to determine that the region behind the vehicle includes the object 104. The parameter(s) can include one or more of a velocity (e.g., first velocity) $V_1$ of the vehicle 102 and/or a velocity (e.g., second velocity) $V_2$ of the object 104. In such cases in which the vehicle velocity and the object velocity are determined, the parameter(s) can include a velocity difference between them. The parameter(s) can include a distance D determined between the vehicle 102 and the object 104, based on, for example, the vehicle location and/or the object location. The parameter(s) can include a deceleration value 106 associated with the vehicle 102 braking, in such cases in which the vehicle 102 brakes.

Although the deceleration value 106 can be included in the parameter(s) and utilized for various techniques as discussed throughout this disclosure, it is not limited as such. In some examples, one or more maneuver values, managed individually, in combination, or integrated as a single combination value (e.g., a value array), can be utilized instead of the deceleration value 106 to implement any of the techniques discussed herein in a similar way as for the deceleration value 106. The maneuver value(s) can include one or more of various types of maneuver values (e.g., one or more of a deceleration value, a swerve value (e.g., evasive maneuver value), a jerk value, an acceleration value, a braking value, etc.) The maneuver value(s) can be utilized to determine a maneuver distance (e.g., a distance travelled by the vehicle 102 as a result of the vehicle 102 maneuvering according to the maneuver value(s)). Maneuver value(s) (e.g., one or more of a deceleration value, a swerve value (e.g., evasive maneuver value), a jerk value, an acceleration value, a braking value, etc.) and/or maneuver distance(s) associated with corresponding objects (e.g., the object 104) can be determined in a similar manner as discussed above.

The data utilized to determine the behavior of the object 104 can include probability distribution data 108 associated with behavior (e.g., previous behavior) of objects. The probability distribution data 108 can be associated with a fleet of vehicles, including the vehicle 102. The probability distribution data 108 can include log data indicating reaction times associated with objects maneuvering (e.g., braking), and/or maneuver (e.g., deceleration) values associated with the objects. The log data, which can include a large collection of vehicle logs, can be gathered from the fleet of vehicles operating over various lengths of time. The probability distribution data 108 can be applied across the fleet of vehicles using a common configuration to determine one or more rear-end exposure metrics. The rear-end exposure metric(s) can be determined based on a likelihood that autonomous operation of the vehicles will result in the vehicle being rear ended. The probability distribution data 108 can be utilized to determine the likelihood that autonomous operation of the vehicles will result in the vehicles being rear ended. Any vehicles in the fleet of vehicles or other vehicles can utilize likelihoods (e.g., the likelihood determined based on the probability distribution data 108) to anticipate potential rear-end collisions. The vehicles can be controlled safely based on the probability distribution data 108 to avoid collisions (e.g., the rear-end collisions).

The probability distribution data 108 can include an estimated deceleration profile including one or more reaction times of the object 104 and/or one or more maneuver values of the object 104. The reaction time(s) can include one or more of individual ones of reaction times associated with the object 104, based on the object 104 maneuvering (e.g., braking, swerving, accelerating, performing an evasive action, etc.).

The probability distribution data 108 can be associated with behavior (e.g., previous behavior) of various objects (e.g., the object 104 and/or one or more other objects). In some examples, the log data (e.g., data that represents the behavior (e.g., previous behavior) of the object 104 and/or one or more other objects) can be received from the object 104 and/or one or more other objects. In such cases (e.g., previous cases) of an object (e.g., the object 104 and/or one or more other objects) braking, the probability distribution data 108 can include data representing portions of the log data, such as one or more reaction times associated with corresponding occurrences of the object (e.g., the object 104 and/or one or more other objects) braking, and/or one or more deceleration values associated with corresponding occurrences of the object (e.g., the object 104 and/or one or more other objects) braking.

The log data can include vehicle data representing the autonomous vehicle traversing an operational domain proximate to the vehicle 102. The operational domain can be determined (e.g., selected) from among a plurality of domains associated with the vehicle 102. In some examples, any of the operational domains can be the environment in which the vehicle is traversing, a portion (e.g., a street, a block, a neighborhood, a city, etc.) of the environment, and/or any other domain associated with the vehicle 102. In those or other examples, any of the operational domains can be associated with a period of time (e.g., the portion of the environment between an initial time and an end time). For example, details of operational domains, as well as different areas of a map, road type, etc., are discussed in U.S. application Ser. No. 16/370,696, which is herein incorporated by reference in its entirety and for all purposes.

Reaction times and/or deceleration values of objects (e.g., the object 104) can be determined based on the vehicle 102 braking and the object 104 braking. In some examples, a reaction time and/or a deceleration value can be determined as corresponding ones of the parameter(s), in such cases in which the vehicle 102 brakes and the object 104 brakes. The reaction time being relatively higher may be utilized to represent a larger amount of time passing before an object 104 begins to slow down after the vehicle 102 begins slowing down, in comparison to a relatively lower reaction time. The deceleration value being relatively higher may be utilized to represent a greater level of deceleration exhibited by the object 104 that begins to slow down after the vehicle 102 begins slowing down, in comparison to a relatively lower deceleration value.

In some examples, a portion (e.g., an entire portion or a partial portion) of the probability distribution data 108 can be received from an external system. The probability distribution data 108 can include data (e.g., previously received data) representing individual ones of reaction times associated with one or more corresponding objects braking, and/or individual ones of deceleration values associated with the corresponding objects(s) braking.

The probability distribution data 108 can include one or more probabilities, such as reactivity probability(ies), as illustrated in a graph 110 in FIG. 1. For example, individual ones of the reactivity probability(ies) can be determined based on a corresponding object reaction time and/or a corresponding object deceleration value. A reactivity value (or "reactivity") can be utilized to represent an object reaction time, an object deceleration value, or a combination of the object reaction time and the object deceleration value. The reactivity value can be linearly related, and/or non-linearly related, to a corresponding reaction time and/or a corresponding object deceleration value. The reactivity can be determined based on a weight associated with the corresponding object deceleration value and/or a weight associated with the corresponding reaction time. The probability(ies) illustrated in the graph 110 can be associated with one or more metrics (e.g., corresponding reactivity values, including the corresponding object reaction times and/or the corresponding object deceleration values).

In some examples, probability distribution data 108 can be based on a classification type of the object 104, based on a portion of an observed trajectory of the object 104, and/or based on environmental conditions (e.g., weather, estimated or determined friction coefficient of a drivable surface, etc.).

In some examples, the probability(ies) illustrated in the graph 110 can include probabilities associated with corresponding metrics (e.g., combined values including corresponding reaction times (in seconds) and corresponding maximum (or "max") decelerations (in meters/second/second)), in example table 1, shown below.

(1)

| Reaction Time | Max Deceleration | Probability |
|---|---|---|
| 0.29 | −7.8 | 10% |
| 0.45 | −6.9 | 10% |
| 0.65 | −5.9 | 15% |
| 1.00 | −5.9 | 30% |
| 1.50 | −5.9 | 15% |
| 1.80 | −4.0 | 10% |
| 2.10 | −4.0 | 10% |

Although values for the reaction times, the max decelerations, and the probabilities can be utilized as shown above in table 1 in the current disclosure, it is not limited as such. Any values for any of the reaction times, the max decelerations, and/or the probabilities can be utilized to implement any of the techniques as discussed herein.

A rear end collision probability (or "rear collision probability") 112 (e.g., a probability associated with a collision at a rear end of the vehicle 102) can be determined utilizing the sensor data and/or the data associated with behavior of the vehicle 102 and/or the object 104. In some instances, for example with the vehicle 102 being a bidirectional vehicle, the vehicle 102 may have a first end, and a second end opposite the first end. If the vehicle 102 is travelling in a direction of the first end, the second end may be considered the "rear end." If the vehicle reverses direction and travels in a direction of the second end, the first end may be considered the "rear end." In some examples, the rear collision probability 112 can be determined based on the vehicle data, the object data, the vehicle deceleration value 106, and/or the probability distribution data 108.

In some examples, the rear collision probability 112 can be utilized to determine vehicle control parameters for operating vehicles (e.g., the vehicle 102) in operational domains (e.g., the operational domain of the vehicle 102). One or more parameters of a controller of the vehicle 102 can be determined and/or updated. The parameter(s) can be determined and/or updated based on the rear collision probability 112. Information utilized to determine the parameter(s) can include information indicating the rear collision probability 112 and/or a level of aggressiveness of objects (e.g., the object 104) proximate (e.g., behind) vehicles (e.g., the vehicle 102). The level of aggressiveness can be determined based on the rear collision probability 112 and/or the environment through which the vehicle 102 is travelling (e.g., portions of the environment, including one or more of landmarks, objects, pedestrians, a road curvature, a road width, and the like) (e.g., aspects of the environment, including one or more of a weather condition, a road condition, and the like). The information indicating the level of aggressiveness can be utilized to set one or more targets to determine a level of aggressiveness or conservativeness of operation of the vehicle 102. The target(s) can be utilized to determine a level of aggressiveness of the fleet of vehicles, and/or a level of aggressiveness of individual ones of the fleet of vehicles.

Alternatively or additionally, the target(s) determined based on rear collision probabilities of one or more of the fleet of vehicles can be utilized to achieve a number of collisions of the fleet of vehicles. Achieving the number of collisions can include controlling one or more vehicles in the fleet of vehicles to maintain the number of collisions below a threshold number of collisions. One or more of the fleet of vehicles utilized to determine the target(s) and/or one or more of the fleet of vehicles to maintain the number of collisions below the threshold number of collisions can be vehicle(s) within the operational domain. The parameter(s) can be updated based on the target(s). Updating the parameter(s) (e.g., updating parameter(s) of the vehicle 102, and/or any other vehicles) based on the target(s) can be performed to achieve the number of collisions below the threshold number of collisions.

Although the rear collision probability 112 can be determined and utilized throughout various techniques as discussed throughout this disclosure, it is not limited as such. In some examples, any type of collision probability can be determined instead of the rear collision probability 112 to implement any of the techniques discussed herein in a similar way as for the rear collision probability 112. The collision probability(ies) can include one or more of a probability of a collision with an oncoming object (e.g., a front end collision probability determined based on the vehicle 102 swerving), a probability of collision with a following object in an adjacent lane (e.g., a rear end collision probability determined based on the vehicle 102 swerving), etc. By way of example, individual ones of the collision probability(ies) can be determined based on the log data (e.g., the probability distribution data), maneuver values of the object(s) and the vehicle 102, and/or the probability(ies) of collisions between the vehicle 102 and the object(s).

Although velocities of the vehicle 102 and the object 104, and the distance between the vehicle 102 and the object 104, can be utilized to determine the collision probability as discussed throughout this disclosure, it is not limited as such. In some examples, any type of maneuver difference associated with individual ones of the vehicle 102 and the object 104 can be utilized to determine the collision probability in a similar way as for the difference between velocities, and implemented for any of the techniques discussed herein. In some examples, one or more types of maneuver differences utilized to determine the collision probability can include one or more a difference between amounts of swerving, a difference between jerk levels, a difference between acceleration levels, a difference between braking levels, etc.

In some examples, the vehicle 102 can be controlled based on the rear collision probability 112 (e.g., the rear collision probability 112 being below a threshold). In those examples, the vehicle 102 can be controlled based on the parameter(s) of the controller. Updating the parameter(s) can include the vehicle being controlled. Updating the parameter(s) can include performing and/or modifying control of the vehicle. In those or other examples, the vehicle 102 can be controlled based on a reaction distance associated with the object 104, a deceleration distance associated with the object 104, and/or a deceleration distance associate with the vehicle 102. The reaction distance associated with the object 104 can be determined based on the object velocity and the object reaction time. The deceleration distance associated with the object 104 can be determined based on the object velocity and the object deceleration value. The deceleration distance associate with the vehicle 102 can be determined based on the velocity of the vehicle 102 and the declaration value. The vehicle 102 can be controlled based on determining that a sum (e.g., first sum) of the object reaction distance and the object deceleration distance is greater than a sum (e.g., second sum) of the vehicle deceleration distance and a separation distance (e.g., a distance between the vehicle 102 and the object 104). In some examples, the vehicle 102 can be controlled, based on the vehicle 102 having a velocity that is greater than or equal to a threshold velocity (e.g., 0.1 m/s, 1 m/s, 10 m/s, etc.). In some instances, the deceleration value can be determined and utilized to stop the vehicle 102 at a stop line.

In some examples, data including a vehicle reaction time and a vehicle deceleration time of the vehicle 102 can be utilized to implement any techniques discussed herein in a similar way as for the vehicle reaction distance and the vehicle deceleration distance, respectively. In those or other examples, data including an object reaction time and an object deceleration time of the object 104 can be utilized to implement any techniques discussed herein in a similar way as for the object reaction distance and the object deceleration distance, respectively.

A metric (e.g., relative tailgating state metric) can be utilized to determine the rear collision probability 112. The relative tailgating state metric can represent a percentage of miles travelled by the vehicle 102 during which the vehicle 102 was being tailgated. The relative tailgating state metric can be determined based on a metric (e.g., first distance metric) representing the vehicle 102 associated with a tailgated state, and a metric (e.g., second distance metric) representing a distance traveled by the vehicle 102 (e.g., a total distance traveled by the vehicle 102 autonomously, not including the distance traveled by the vehicle 102 under non-autonomous operation, such as by utilizing a safety driver). In some examples, the relative tailgating state metric can be determined as a quotient of the metric representing the vehicle 102 associated with the tailgated state, divided by the metric representing the distance (e.g., total distance of autonomous operation) traveled by the vehicle 102. In some examples, the total distance of autonomous operation of the vehicle 102 can be the total distance traveled by the vehicle 102 under autonomous operation (e.g., not under operation associated with a safety driver) since being activated (e.g., put into commission), put into use, turned on, and/or controlled to move, after being, respectively, inactive, unused, turned off, and/or stopped for an amount of time that meets or exceeds a threshold amount of time. A higher relative tailgating state metric may represent a larger probability of a rear collision, in comparison to a lower relative tailgating state metric.

A metric (e.g., relative tailgating state metric) can including a metric indicating a length of time during which the vehicle is being tailgated. The relative tailgating state metric can represent an amount of time (e.g., a total amount of time) travelled by the vehicle 102 during which the vehicle 102 was being tailgated. The amount of time can be associated with a continuous amount of time during which the vehicle 102 was tailgated, or a total amount of time of corresponding times of separate occurrences in which the vehicle 102 was tailgated (e.g., tailgated by the object 104 and/or other objects). The relative tailgating state metric can be determined based on a metric (e.g., a first time metric) representing the vehicle 102 associated with a tailgated state, and a metric (e.g., a second time metric) representing an amount of time traveled by the vehicle 102 (e.g., a total distance traveled by the vehicle 102 autonomously, not including the distance traveled by the vehicle 102 under non-autonomous operation, such as by utilizing a safety driver).

Metrics associated with distance and time can be separate metrics or combined metrics. In some examples, any metric (e.g., any distance metric and/or any time metric) can be implemented as a distance metric combined with a time metric, or vice versa. Although the time metrics and the distance metrics can be utilized to determine the vehicle 102 is associated with the tailgated state, as discussed throughout this disclosure, it is not limited as such. Any of the distance metrics and/or the time metrics can be utilized, individually or in combination, to determine whether the vehicle 102 is associated with the tailgating state. By way of example, a distance and/or a time of the vehicle 102 associated with a tailgating state, can be utilized along with a distance and/or a time travelled by the vehicle 102, to determine a relative number representing a relative tailgating state metric representing a probability of a rear collision.

Determining the vehicle 102 as being tailgated can be based on various characteristics and/or parameters associated with the vehicle 102 and/or the object 104. In some examples, the vehicle 102 can be determined as being tailgated based on an angular difference (e.g., 45 degrees) between a first direction of travel of the vehicle 102 and a second direction of travel of the object 104 being less than a threshold angle. In additional or alternative examples, the vehicle 102 can be determined as being tailgated based on a distance between the vehicle 102 and the object 104 being less than a threshold difference. Alternatively or additionally, the vehicle 102 can be determined as being tailgated further based on the velocity difference between the velocity of the vehicle 102 and the velocity of the object 104 meeting or exceeding a threshold velocity difference, in such cases as the vehicle 102 having a velocity that is less than the velocity of the object 104. Although the angular difference of 45 degrees can be utilized as discussed above in the current disclosure, it is not limited as such. Any angular difference (e.g., 10 degrees, 30 degrees, 60 degrees, etc.) can be utilized to determine the vehicle 102 is being tailgated.

The vehicle 102 determined as being tailgated can be based on one or more trajectories determined for the object 104. In some examples, the vehicle 102 determined as being tailgated can be based on a difference between the predicted trajectory of the object 104 and a planned trajectory (e.g., actual trajectory) of the object 104. In some examples, the vehicle 102 determined as being tailgated can be based on the difference between the predicted trajectory of the object 104 and the planned trajectory being less than a threshold difference (or "threshold trajectory difference).

Although any of angular differences and/or trajectories can be utilized to determine whether the vehicle 102 is being tailgated, as discussed above in this disclosure, it is not limited as such. In some examples, any of the angular differences and/or the trajectories can be utilized, individually or in combination, to determine whether the vehicle 102 is being tailgated.

As described above, a level of safety resulting from how the vehicle 102 is controlled can be increased by utilizing information associated with vehicle behavior and object behavior. The vehicle deceleration value 106 can be utilized along with the probability distribution data 108 to accurately determine whether, and how fast, the vehicle 102 should be controlled to stop based on various hazards. The vehicle 102 can be controlled to stop at various decelerations, including slower rates of deceleration, for cases in which the slower deceleration does not pose a threat of injury or harm to the vehicle 102 and/or vehicle occupants. The slower rates of deceleration can be utilized to reduce a likelihood of a rear end collision with the object 104. The slower rates of deceleration can be utilized for circumstances associated with relatively lower reactivity probabilities representing large object reaction times and/or small object deceleration values. For other circumstances associated with relatively higher reactivity probabilities representing small object reaction times and/or large object deceleration values, the vehicle 102 can be controlled to stop at higher rates of deceleration. Additionally or alternatively, the vehicle 102 can be controlled to stop at higher rates of deceleration if warranted by the circumstances for any of various reasons (e.g., a large number of objects in the environment, objects moving unpredictably, objects moving at high speeds, poor weather conditions, poor visibility, etc.).

Figure 2:
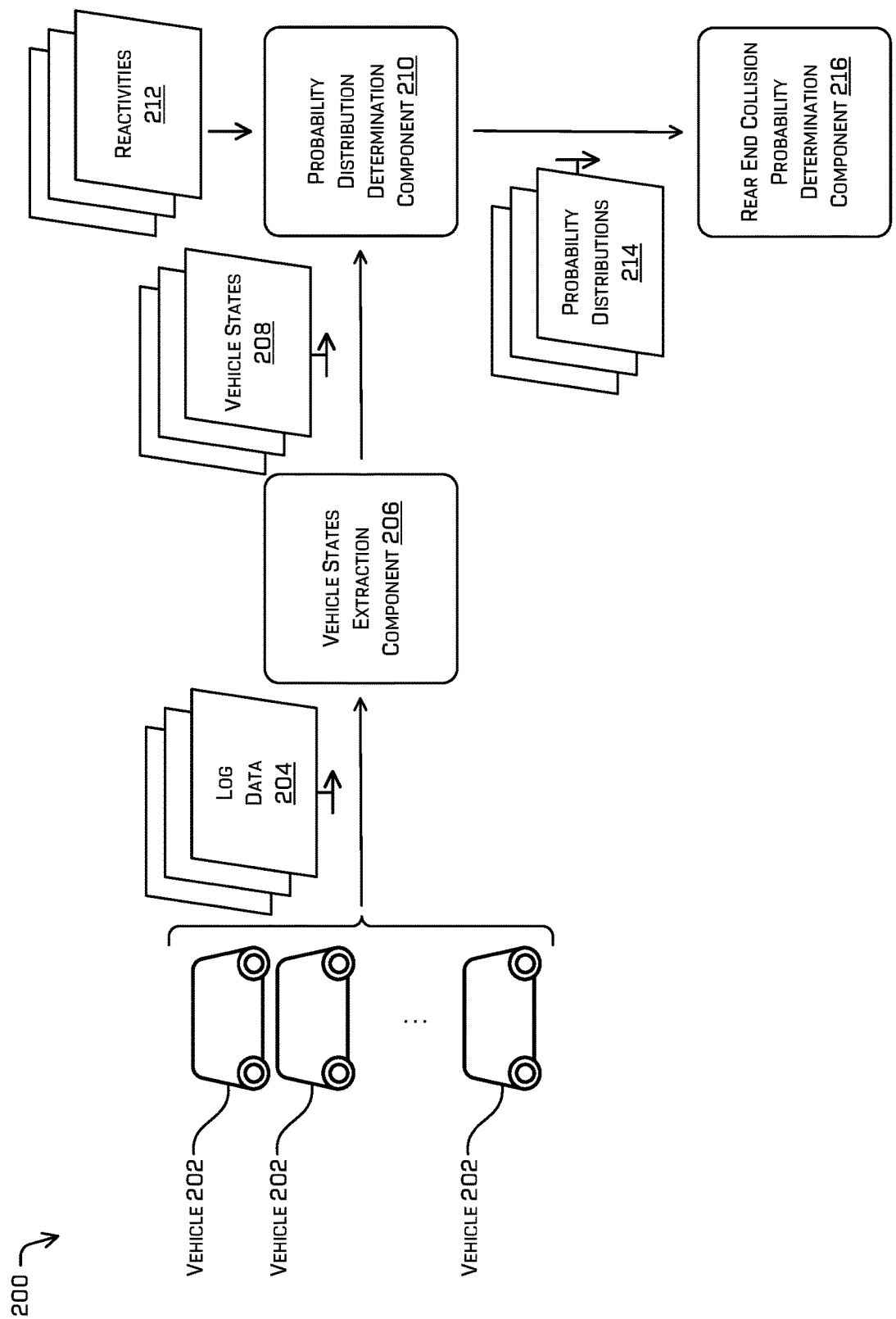
FIG. 2 is an example flow diagram illustrating an example architecture of a rear end collision probability calculation system, in accordance with examples of the disclosure.

FIG. 2. is an example flow diagram 200 illustrating an example architecture of a rear end collision probability calculation system, in accordance with examples of the disclosure. As illustrated, a plurality of vehicles 202 can transmit information including data associated with individual ones of the vehicles 202. The data can be transmitted by any of the vehicles 202 at a same, or different, time as any of one or more others of the vehicles 202. A combination of individual data transmitted by the corresponding vehicles 202 can be collectively referred to as log data 204. In some examples, any of the vehicles 202 can be utilized to implement the vehicle 102 as discussed above with reference to FIG. 1.

The log data 204 can include the sensor data and/or the behavior data associated with the corresponding vehicles 202. In some examples, the vehicle data and/or the object data that is captured by the corresponding vehicles 202, in a similar way as for the vehicle data and/or the object data captured by the vehicle 102 as discussed above with reference to FIG. 1, can be included in the log data 204. The log data 204 can be utilized for the determining the probability distribution data 108, and/or for determining a reactivity probability of the probability distribution data 108 based on the object data and/or the parameter(s) determined by the sensor data captured by the vehicle 102. In additional or alternative examples, one or more parameters determined based on the sensor data received from the corresponding vehicles 202 can be included in the log data 204, in a similar way as for parameter(s) determined based on the sensor data captured by the vehicle 102 as discussed above with reference to FIG. 1.

A vehicle states extraction component 206 can be utilized to determine vehicle state information (or "vehicle tailgated state information") associated with the vehicles 202. The vehicle state information can include vehicle states (or "vehicle tailgated states") 208 based on the sensor data and/or the log data 204, individual ones of the vehicle states being associated with the corresponding vehicles 202. In some examples, individual ones of the vehicle states 208 can indicate a vehicle tailgated state associated with a distance travelled while being tailgated. In those examples, individual ones of the vehicle states 208 can be integrated within data that also includes a total distance traveled by the corresponding vehicles 202. The data including the vehicle states 208 and the total distance traveled by the corresponding vehicles 202 can be utilized in a similar way as discussed above for the vehicle states 208. The distance travelled while being tailgated can represent a portion (e.g., a partial portion or an entire portion) of the total distance traveled.

Various types of information can be utilized to determine the vehicle state information. Individual ones of the vehicle states 208 associated with the corresponding vehicles 202 can be a value determined as a combination of one or more incremental vehicle states (e.g., incremental vehicle states associated with a period (e.g., $1/1000$ seconds, $1/100$ seconds, $1/10$ seconds, 1 second, etc.) of driving time) associated with the corresponding vehicles 202 being tailgated. Individual ones of the vehicles 202 may be treated as having a constant speed for any of the incremental vehicle states. Individual ones of the vehicles 202 may be treated as having movement that changes instantaneously (e.g., a velocity that changes to another velocity). Individual ones of the vehicles 202 may be treated as moving in a single dimension, with a lateral movement component (e.g., movement perpendicular to a road) and a longitudinal component of movement (e.g., movement parallel to a road). Although the vehicles 202 may be treated as having a constant speed for incremental vehicle states, instantaneous movement, movement in a single dimension as discussed above in this disclosure, it is not limited as such. In some examples, individual ones of the vehicles 202 may be treated as having a varying speed for incremental vehicle states, continuous (e.g., non-instantaneous) movement, and/or movement in more than one dimension.

Determining the vehicles 202 are being tailgated can be based on various characteristics and/or parameters associated with the vehicles 202 and/or objects in regions behind the vehicles 202. The vehicles 202 can be determined as being tailgated in a similar way as for the vehicle 102, as discussed above with reference to FIG. 1.

Various circumstances of the vehicles 202 can be utilized to determine the vehicle states 208. In some examples, individual ones of vehicles states 208 can be associated with the corresponding vehicles 202 changing from being inactive (e.g., out of commission) to active (e.g., in commission), from being unused to being used, from being turned off to being turned on, and/or from being stopped to being in motion, after being unused, turned off, and/or stopped for an amount of time that meets or exceeds a threshold amount of time.

A probability distribution determination component 210 can utilize reactivities (or "reactivity values") 212 to determine probability distributions 214. Individual ones of the reactivities 212 can be associated with the corresponding vehicle states 208. Individual ones of the reactivities 212 can be determined based on the sensor data captured by the corresponding vehicles 202, and/or the parameter(s) determined based on the sensor data. Individual ones of the reactivities 212 can be represent, in a similar way as for the reactivity value as discussed above with reference to FIG. 1, an object reaction time, an object deceleration value, or a combination of the object reaction time and the object deceleration value.

The probability distribution determination component 210 can determine metrics (e.g., relative tailgating state metrics), individual ones of the relative tailgating state metrics being associated with the corresponding vehicle states 208. In some examples, a relative tailgating state metric can indicate a percentage number of miles travelled while being tailgated. The relative tailgating state metric can be determined based on a metric (e.g., first distance metric) representing a distance travelled while being tailgated, and a metric (e.g., second distance metric) representing a total distance traveled.

The probability distribution determination component 210 can determine the probability distributions 214 based on the vehicle states 208 and the reactivities 212. Individual ones of the probability distributions can be determined based on the corresponding vehicle states 208 and the corresponding reactivities 212.

A rear end collision probability determination component (or "rear collision probability determination component") 216 can be utilized to determine rear collision probabilities. Individual ones of the rear collision probabilities associated with the corresponding vehicles 202 can be determined in a similar way as for the rear collision probability 112 associated with the vehicle 102, as discussed above with reference to FIG. 1.

A plurality of rear collision probabilities can be utilized individually or in combination with one or more of any of the plurality of rear collision probabilities to update one or more parameter(s) of a controller of the vehicle 102. The rear collision probabilities can be determined based on vehicle logs that are analyzed to determine metrics around likelihoods that one or more corresponding vehicles in a fleet of vehicles will result in the vehicle being rear ended. The parameter(s) can be updated based on one or more of the collision probability(ies) associated with individual objects (e.g., the object 104, as discussed above with reference to FIG. 1) and/or one or more deceleration values of the vehicle 102.

Any of the probability(ies) determined the rear collision probability determination component 216 can be based on the vehicle logs being analyzed to identify vehicles and objects with similar circumstances (e.g., respectively locations, velocities, accelerations, jerks, etc.) as for the vehicle 102 and the object 104, respectively. By way of example, the logs can be discretized to filter segments including vehicles (e.g., autonomous vehicles) being tailgated (e.g., vehicles being tailgated in a similar way as the vehicle 102 being tailgated by the object 104). One or more of the logs can be generated from simulated runs of one or more of the fleet of vehicles.

Figure 3:
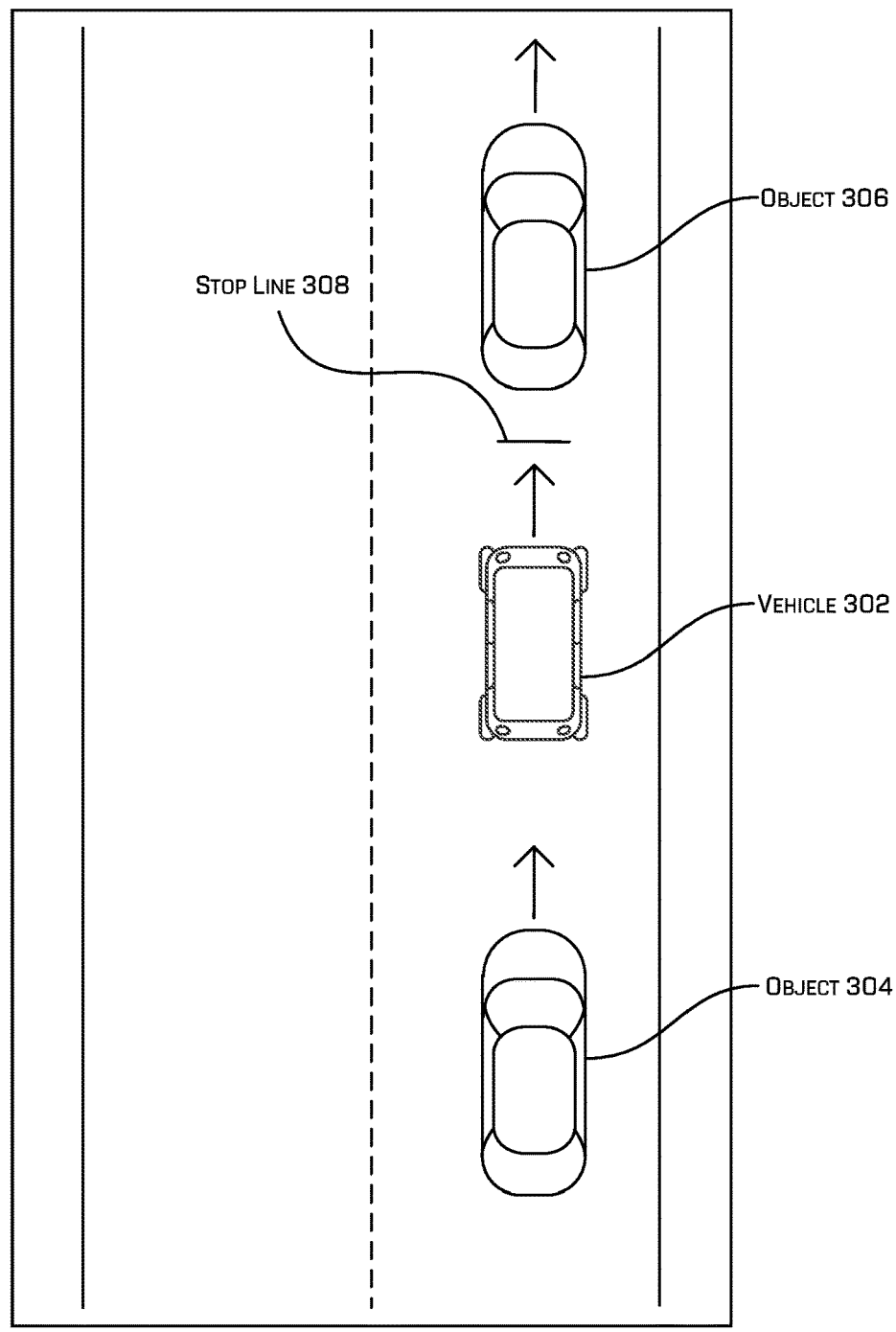
FIG. 3 illustrates an example environment including a vehicle, and objects travelling behind, and ahead of, the vehicle, in accordance with examples of the disclosure.

FIG. 3 illustrates an example environment 300 including a vehicle, and objects travelling behind, and ahead of, the vehicle, in accordance with examples of the disclosure. As illustrated, a vehicle 302, an object 304, and an object 306 can be traversing through an environment. The vehicle 302 and the object 304 can be implemented in a similar way as the vehicle 102 and the object 104, respectively, as discussed above with reference to FIG. 1. In additional or alternative examples, the vehicle 302 can utilize the sensor data to determine information (e.g., parameter(s) and/or metric(s)) associated with the object 306, in a similar way as for the sensor data utilized to determine information associated with the object 104 as discussed above with reference to FIG. 1. In some examples, the information associated with the object 306 can indicate the object 306 is travelling in front of, and in a region ahead of the vehicle 302.

Front end collision probability data (or "front collision probability data") including a front end collision probability (or "front collision probability") associated with the vehicle 302 and the object 306 can be determined. The front collision probability can be determined based on the sensor data. One or more parameters (e.g., corresponding velocities of the vehicle 302 and the object 306, and a velocity difference between the velocities, a distance between the vehicle 302 and the object 306, etc.) and/or one or more metrics (e.g., a distance metric representing the vehicle 302 associated with a following state, a distance metric representing a distance traveled by the vehicle 302, and/or a relative number representing a relative tailgating state metric) can be determined for the vehicle 302 following the object 306 in a similar way as for the vehicle 302 being tailgated by the object 304.

The vehicle 302 can be determined as following the object 306 based on an angular difference (e.g., 45 degrees) between a first direction of travel of the vehicle 302 and a second direction of travel of the object 306 being less than a threshold angle. Alternatively or additionally, the vehicle 302 can be determined as following the object 306 further based on a distance between the vehicle 302 and the object 306 being less than a threshold difference. Alternatively or additionally, the vehicle 302 can be determined as following the vehicle 306 further based on the velocity difference between the velocity of the vehicle 302 and the velocity of the object 306 meeting or exceeding a threshold velocity difference, in such cases as the vehicle 302 having a velocity that is greater than or equal to the velocity of the object 306. Although the angular difference of 45 degrees for determining the vehicle 302 as following the object 306 can be utilized as discussed above in the current disclosure, it is not limited as such. Any angular difference (e.g., 10 degrees, 30 degrees, 60 degrees, etc.) can be utilized to determine the vehicle 302 as following the object 306.

A vehicle state (or "vehicle following state") and/or a relative following state metric can be utilized to indicate information about the vehicle 302 following the object 306. The vehicle following state can be determined in a similar way as for the vehicle tailgated state discussed above with reference to FIG. 2. The relative following state metric can be determined based on a metric (e.g., third distance metric) representing a distance travelled while following, and a metric (e.g., fourth distance metric) representing a total distance traveled, in a similar way as for the relative tailgating state metric determined based on the first and second distance metrics, as discussed above with reference to FIG. 2. In some examples, the fourth distance metric can be the same as, or different from, as the second distance metric representing the total distance traveled for determining the relative tailgating state metric, as discussed above with reference to FIG. 2. In those examples, a portion of the environment traversed by the vehicle 102 that is utilized to determine the fourth distance metric can overlap (e.g., partially overlap or completely overlap), or not overlap, a portion of the environment traversed by the vehicle 102 that is utilized to determine the second distance metric.

The front collision probability associated with the vehicle 302 and the object 306 can be determined further based on the vehicle data and/or the object data associated with the object 306. Alternatively or additionally, the front collision probability associated with the vehicle 302 and the object 306 can be determined further based on the vehicle state and/or the relative following state metric.

In some examples, the rear collision probability and the front collision probability can be utilized to control the vehicle 302. The vehicle 302 can be controlled to brake and/or stop at a deceleration value (e.g., −0.5 meters/second/second (m/s/s), −1 m/s/s, −5 m/s/s, −8 m/s/s, −15 m/s/s, etc.) based on the rear collision probability and the front collision probability. The deceleration value can be determined based on a difference between the rear collision probability and the front collision probability. The deceleration value being relatively larger can be utilized based on the rear collision probability being less than the front collision probability. The deceleration value being relatively smaller can be utilized based on the rear collision probability being greater than or equal to the front collision probability. Additionally or alternatively, the deceleration value can be determined and/or adjusted based on a weight associated with the rear collision probability and a weight associated with the front collision probability. The weights can be utilized to compensate for relative dangers (e.g., likelihoods of causing harm to vehicle occupants) associated with physical characteristics of corresponding object ends (e.g., ends of the object 304 and the object 306) nearest to the vehicle 302 due to collisions. In some instances, the deceleration value can be determined and utilized to stop the vehicle 302 at a stop line 308.

Log data associated with vehicles following objects can be determined and utilized in a similar way as for the log data 204, as discussed above with reference to FIG. 2. In some examples, one or more characteristics, one or more parameters, and/or one or more metrics can be determined and added to the log data associated with individual ones of a plurality of vehicles following corresponding objects, in a similar way as for the vehicle 302 following the object 306. The log data can be utilized, additionally or alternatively to any of the information as discussed above, to determine the front collision probability utilized to control the vehicle 302.

Figure 4:
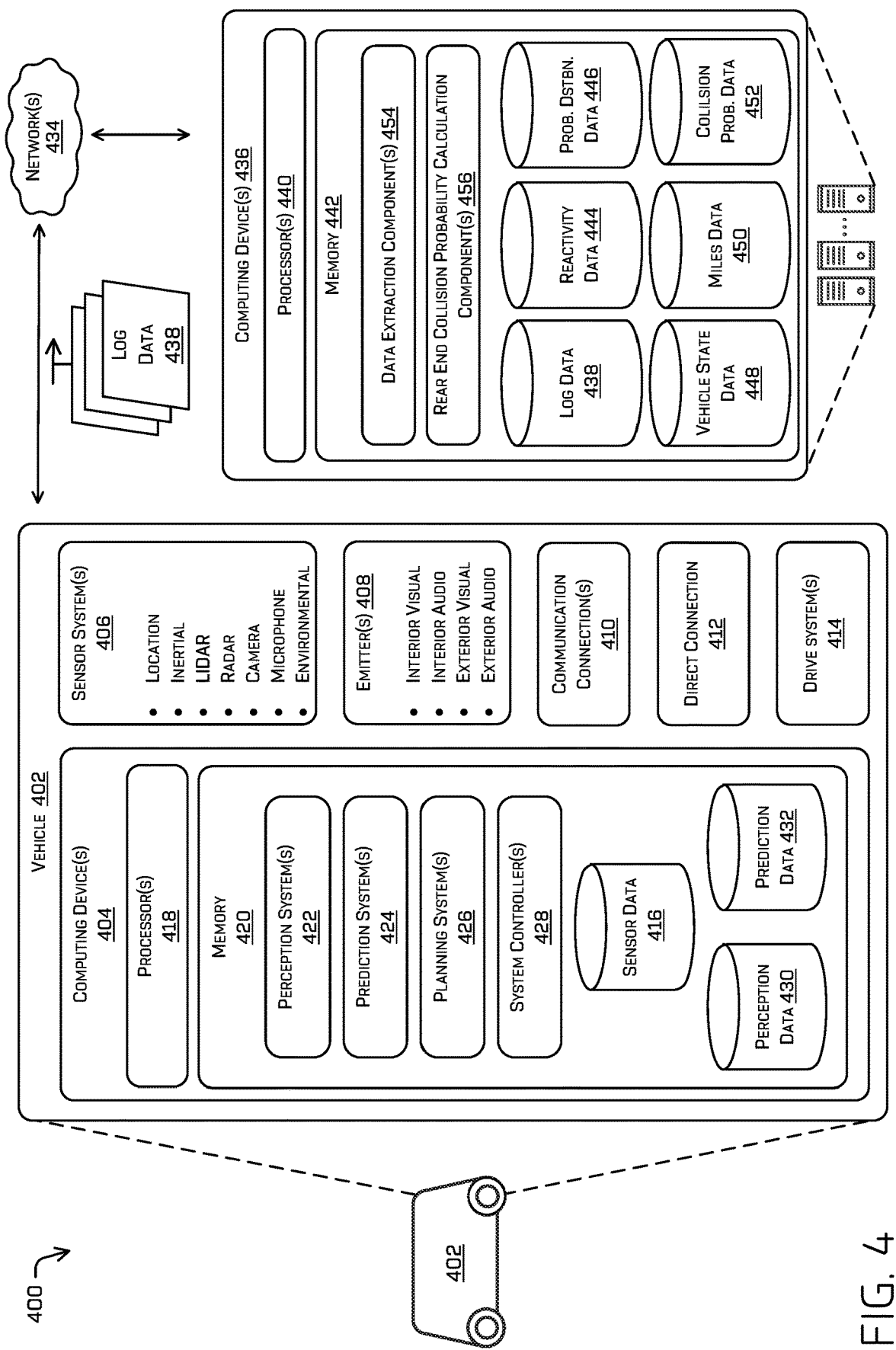
FIG. 4 illustrates an example of vehicles generating log data and transmitting the log data to the rear end collision probability calculation system of FIG. 2, in accordance with implementations of the disclosure.

FIG. 4 illustrates an example architecture 400 for a rear end collision probability calculation system, in accordance with implementations of the disclosure. In at least one example, the architecture 400 may include a vehicle 402, such the autonomous vehicles discussed above. The vehicle 402 may be utilized to implement the vehicles 102, 202, and/or 302 (e.g., any of the techniques utilized to implement any of the vehicles 102-402 can be utilized to implement any of the other vehicles 102-402). The vehicle 402 may include computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 may be configured to capture the sensor data 416 associated with a surrounding physical environment.

In at least some examples, the sensor system(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 406 may include multiple instances of each type of sensors. For instance, time-of-flight sensors may include individual time-of-flight sensors located at the corners, front, back, sides, and/or top of the vehicle 402. As another example, camera sensors may include multiple cameras disposed at various locations about the exterior and/or interior of the vehicle 402. In some cases, the sensor system(s) 406 may provide input to the computing device(s) 404.

The vehicle 402 may also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., a remote teleoperations computing device) or remote services. For instance, the communication connection(s) 410 can facilitate communication with other local computing device(s) on the vehicle 402 and/or the drive system(s) 414. Also, the communication connection(s) 410 may allow the vehicle 402 to communicate with other nearby computing device(s) (e.g., other nearby vehicles, traffic signals, etc.).

The communications connection(s) 410 may include physical and/or logical interfaces for connecting the computing device(s) 404 to another computing device or one or more external network(s) 434 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 410 may comprise the one or more modems as described in detail above.

In at least one example, the vehicle 402 may include one or more drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which may receive and preprocess data from the sensor system(s) 406 and to control operation of the various vehicle systems. In some examples, the drive system controller can include one or more processor(s) and memory communicatively coupled with the one or more processor(s). The memory can store one or more modules to perform various functionalities of the drive system(s) 414. Furthermore, the drive system(s) 414 also include one or more communication connection(s) that enable communication by the respective drive system with one or more other local or remote computing device(s).

The computing device(s) 404 may include one or more processors 418 and one or more memories 420 communicatively coupled with the processor(s) 418. In the illustrated example, the memory 420 of the computing device(s) 404 stores perception systems(s) 422, prediction systems(s) 424, planning systems(s) 426, as well as one or more system controller(s) 428. The memory 420 may also store data such as sensor data 416 captured or collected by the one or more sensors systems 406, perception data 430 associated with the processed (e.g., classified and segmented) sensor data 416, prediction data 432 associated with one or more predicted state of the environment and/or detected objects within the environment. Though depicted as residing in the memory 420 for illustrative purposes, it is contemplated that the perception systems(s) 422, prediction systems(s) 424, planning systems(s) 426, as well as one or more system controller(s) 428 may additionally, or alternatively, be accessible to the computing device(s) 404 (e.g., stored in a different component of vehicle 402 and/or be accessible to the vehicle 402 (e.g., stored remotely).

The perception system 422 may be configured to perform object detection, segmentation, and/or classification on the sensor data 416. In some examples, the perception system 422 may generate processed perception data 430 from the sensor data 416. The perception data 430 may indicate a presence of objects that are in physical proximity to the vehicle 402 and/or a classification or type of the objects (e.g., car, pedestrian, cyclist, building, tree, road surface, curb, sidewalk, unknown, etc.). In additional and/or alternative examples, the perception system 422 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which is herein incorporated by reference in its entirety and for all purposes.

The prediction system 424 may be configured to determine a track corresponding to an object identified by the perception system 422. For example, the prediction system 424 may be configured to predict a velocity, position, change in trajectory, or otherwise predict the decisions and movement of the identified objects. For example, the prediction system 424 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, which are herein incorporated by reference in their entirety and for all purposes.

The planning system 426 may be configured to determine a route for the vehicle 402 to follow to traverse through an environment. For example, the planning system 426 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 426 may determine a route to travel from a first location (e.g., a current location) to a second location (e.g., a target location) in order to avoid an object obstructing or blocking a planned path of the vehicle 402. In some case, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 and 15/632,208, which are herein incorporated by reference, in its entirety.

In at least one example, the computing device(s) 404 may store one or more and/or system controllers 428, which may be configured to control steering, propulsion, braking, safety, emitters, communication, and other systems of the vehicle 402. The system controllers 428 may communicate with and/or control corresponding systems of the drive system(s) 414 and/or other components of the vehicle 402, which may be configured to operate in accordance with a route provided from the planning system 426.

In some implementations, the vehicle 402 may connect to computing device(s) 436 via the network(s) 434. For example, the computing device(s) 436 may receive log data 438 from one or more vehicles 402. The log data 438 may include the sensor data, perception data 430, prediction data 432 and/or a combination thereof. The log data may include the log data (e.g., the log data 204) associated with the vehicle 102 and the vehicles 202 being tailgated, and/or the log data associated with the vehicle 302 tailgating and following objects, as discussed above with reference to FIGS. 1, 2, and 3. In some cases, the log data 438 may include portion of one or more of the sensor data, perception data 430, prediction data 432.

The computing device 436 may include one or more processors 440 and memory 442 communicatively coupled with the one or more processors 440. In at least one instance, the processor(s) 440 may be similar to the processor(s) 418 and the memory 442 may be similar to the memory 420. In the illustrated example, the memory 442 of the computing device(s) 436 stores the log data 438 received from one or more vehicles 402. The memory 442 may also store reactivity data 444, probability distribution data 446, vehicle state data 448, miles data (e.g., tailgated and/or following miles data) 450, and collision probability data (e.g., rear end collision probability data and/or front end collision probability data) 452.

The reactivity data 444 may include the reactivities 212, and/or reactivities associated with the objects 304 and 306, as discussed above with reference to FIGS. 2 and 3. In some examples, the object reaction time, the object deceleration value, or the combination of the object reaction time and the object deceleration value of individual ones of the reactivities determined based on the sensor data captured by the corresponding vehicles 402 and/or the vehicle 302 can be included in the reactivity data 444.

The probability distribution data 446 can include the probability distribution data 108 and/or the probability distributions 214 as discussed above with reference to FIGS. 1 and 2, respectively. The probability distribution data 446 can be utilized to determine the collision probability data, including the rear collision probabilities (e.g., the rear collision probability 112).

The vehicle state data 448 can include the vehicle tailgated states (e.g., the vehicles states 208) and/or the vehicle following states associated with the vehicle 402. The vehicle states data 448 can be utilized to determine the collision probability data, including the rear collision probabilities (e.g., the rear collision probability 112) and/or the front collision probabilities.

The miles data 450 can include any of the metric(s) (e.g., the distance metric(s), the relative tailgating state metric, and/or the relative following state metric), as discussed above with reference to FIGS. 1, 2, and 3. The miles data 450 can be utilized to determine the collision probability data, including the rear collision probabilities (e.g., the rear collision probability 112) and/or the front collision probabilities.

The collision probability data 452 can include any of the collision probability data including the rear collision probabilities (e.g., the rear collision probability 112) and/or the front collision probabilities, as discussed above with reference to FIGS. 1, 2, and 3. The collision probability data 452 can be utilized to control the vehicles 102-402.

The memory 442 may also store one or more data extraction components 454, and one or more collision probability calculation components 456. The data extraction component(s) 454 may be configured to parse log data 438 received from one or more vehicles 402 based on a set of time intervals (e.g., every 40 milliseconds, every 80 milliseconds, every 200 milli sections, etc.). For reach time interval, the data extraction component(s) 454 may define parameter(s) and/or metric(s) based on sensor data collected by the vehicle 402.

The collision probability calculation component(s) 456 may generate any of the data stored in the reactivity data 444, the probability distribution data 446, the vehicle state data 448, the miles data 450, and/or the collision probability data 452. In some examples, the collision probability calculation component(s) 456 may be configured to receive as an input or otherwise access sensor data captured by the vehicle 402 and/or map data 448 of actual roads and physical environment.

The processor(s) 418 of the computing device(s) 404 and the processor(s) 440 of the computing device(s) 436 may be any suitable processor capable of executing instructions to process data and perform operations as described herein. By way of example and not limitation, the processor(s) 418 and 436 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420 of the computing device(s) 404 and the memory 442 of the computing device(s) 436 are examples of non-transitory computer-readable media. The memory 420 and 442 can store an operating system and one or more software applications, instructions, programs, and/or data to implement the methods described herein and the functions attributed to the various systems. In various implementations, the memory 420 and 442 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 5:
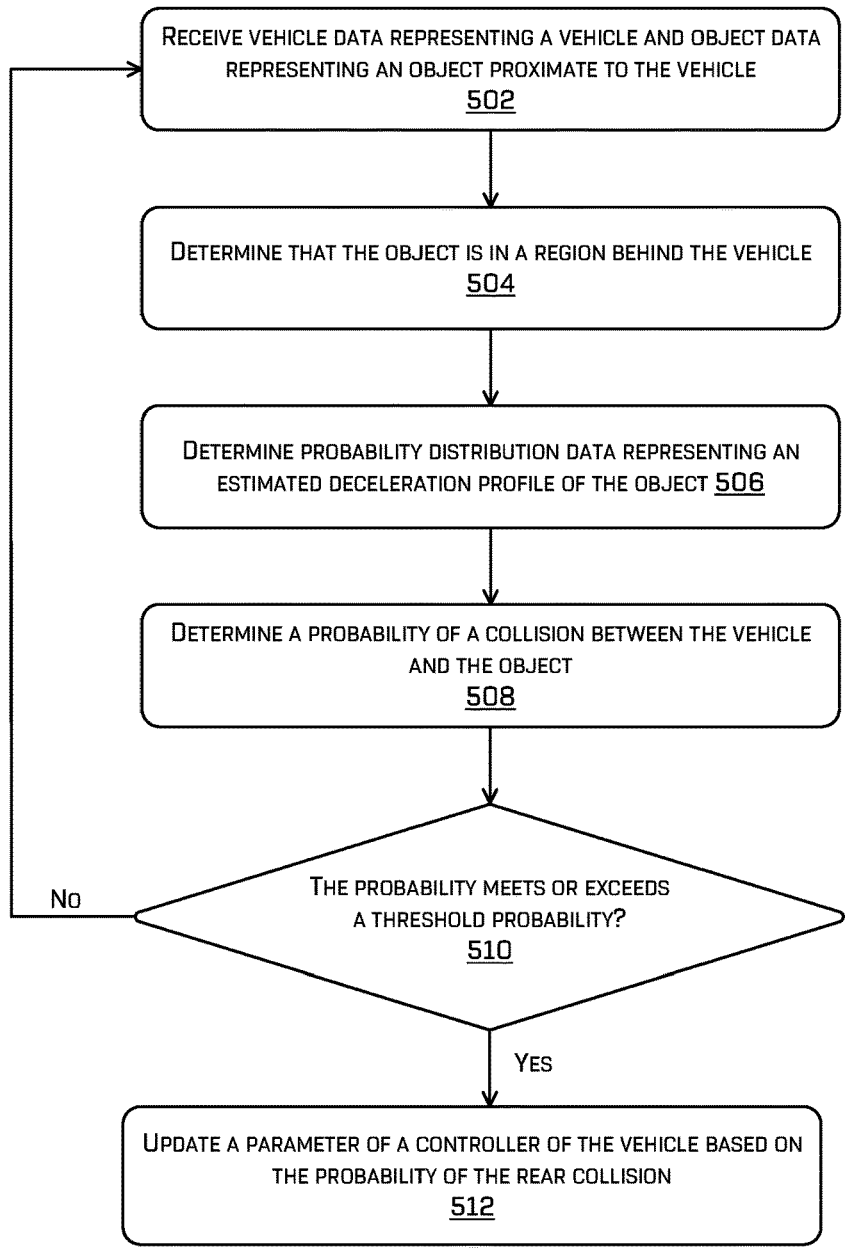
FIG. 5 depicts an example process for performing a rear end collision probability calculation.

FIG. 5 depicts an example process 500 for performing a rear end collision probability calculation. At operation 502, the process may include receiving vehicle data representing a vehicle (e.g., the vehicle 102) and object data representing an object (e.g., the object 104). The vehicle 102 and the object 104 may be traversing an environment. Sensor data that includes the vehicle data and the object data can be captured by the vehicle 102. The sensor data (e.g., the vehicle data and/or the object data) can include one or more physical characteristics (e.g., a size, a shape, etc.), location data, etc.

At operation 504, the process may include determining that the object 104 is in a region behind the vehicle 102. The object 104 can be determined to be in the region behind the vehicle 102 based at least in part on the vehicle data and the object data.

At operation 506, the process may include determining probability distribution data representing an estimated deceleration profile of the object 104. The estimated deceleration profile can include a reaction time (e.g., an object reaction time) of the object 104 and a deceleration value (e.g., an object deceleration value) of the object 104. The probability distribution data can be determined based on log data that includes one or more reaction times and one or more deceleration values associated with the object 104.

At operation 508, the process may include determining a probability of a collision (e.g., a rear collision) between the vehicle and the object. The probability can be determined based on the vehicle data, the object data, the probability distribution data, and a vehicle deceleration value. In some examples, the probability being higher may be associated with a relatively large vehicle deceleration value, in comparison to the probability being relatively lower for a relatively small vehicle deceleration value.

At operation 510, the process may include determining whether the probability meets or exceeds a threshold probability. If so, the process may continue to operation 512. If not, the process may continue to operation 512.

At operation 512, the process may include updating a parameter of a controller of the vehicle 102 based on the probability of the rear collision. In some examples, updating the parameter of the controller can include causing the vehicle 102 to be controlled based on the probability of the rear collision. The vehicle 102 can be controlled to stop at various decelerations, including slower rates of deceleration, for cases in which the slower deceleration does not pose a threat of injury or harm to the vehicle 102 and/or vehicle occupants. The slower rates of deceleration can be utilized for circumstances associated with relatively lower reactivity probabilities representing large object reaction times and/or small object deceleration values. For other circumstances associated with relatively higher reactivity probabilities representing small object reaction times and/or large object deceleration values, the vehicle 102 can be controlled to stop at higher rates of deceleration.

Example Clauses

A: A method comprising: receiving log data including vehicle data representing an autonomous vehicle traversing an operational domain and object data representing an external vehicle traversing the operational domain proximate to the autonomous vehicle: determining, based at least in part on at least one of the vehicle data or map data, a region behind the autonomous vehicle: determining that the external vehicle is located within the region: determining a velocity difference between a first velocity of the autonomous vehicle and a second velocity of the external vehicle: determining a distance between the autonomous vehicle and the external vehicle: receiving probability distribution data representing a reaction time associated with the external vehicle braking and a vehicle deceleration associated with the external vehicle braking: determining a deceleration value associated with the autonomous vehicle braking: determining, based at least in part on the vehicle data, the object data, the probability distribution data, and the deceleration value, a probability of the external vehicle colliding with a rear end of the autonomous vehicle; and updating a parameter of a controller of the autonomous vehicle for operating the autonomous vehicle in the operational domain based at least in part on the probability.

B: The method of paragraph A, further comprising: determining, based at least in part on the vehicle data, the object data, the probability distribution data, and the deceleration value, a first metric representing a first distance or a first time of the autonomous vehicle associated with a tailgating state: determining, based at least in part on the log data, a second metric representing a second distance or a second time traveled by the autonomous vehicle; and determining, based at least in part on the first metric and the second metric, a relative number representing a relative tailgating state metric.

C: The method of paragraph A or B, further comprising at least one of: determining that an angular difference between a first direction of travel of the autonomous vehicle and a second direction of travel of the external vehicle is less than a threshold angle: or determining that a difference between a predicted trajectory of the object and a planned trajectory of the external vehicle is less than a threshold difference.

D: The method of any of paragraphs A-C, wherein determining the probability of the external vehicle colliding with the rear end of the autonomous vehicle comprises: determining, based on the reaction time and the second velocity, a reaction distance: determining, based on the vehicle deceleration and the second velocity, a vehicle deceleration distance: determining, based on the first velocity and the deceleration value, an autonomous vehicle deceleration distance; and determining that a first sum of the reaction distance and the vehicle deceleration distance is greater than a second sum of the autonomous vehicle deceleration distance and the distance.

E: The method of any of paragraphs A-D, wherein: the operational domain is one of a plurality of operational domains: the probability is a first probability associated with a first deceleration value: the first probability is one of a plurality of probabilities; and the first deceleration value is one of a plurality of deceleration values.

F: One or more non-transitory computer-readable media storing instructions that, when executed, cause one or more processors to perform operations comprising: receiving vehicle data representing a vehicle traversing an operational domain and object data representing an object traversing the operational domain proximate to the vehicle: determining, based at least in part on the vehicle data and the object data, that the object is in a region behind the vehicle: determining probability distribution data representing an estimated deceleration profile of the object: determining, based on the vehicle data, the object data, the probability distribution data, and a vehicle maneuver value, a probability of a collision between the vehicle and the object; and updating a parameter of a controller of the vehicle for operating the vehicle in the operational domain based on the probability of the collision.

G: The one or more non-transitory computer-readable media of paragraph F, the operations further comprising: determining a maneuver difference between a first maneuver of a first type of the vehicle and a second maneuver of the first type of the object; and determining a distance between the vehicle and the object, wherein the probability of the collision is further based on the maneuver difference and the distance.

H: The one or more non-transitory computer-readable media of paragraph F or G, wherein the vehicle maneuver value is associated with the vehicle maneuvering.

I: The one or more non-transitory computer-readable media of paragraph H, wherein the probability distribution data includes a first reactivity probability and a second reactivity probability, the first reactivity probability being associated with a first reaction time and a first maneuver value, the second reactivity probability being associated with a second reaction time and a second maneuver value.

J: The one or more non-transitory computer-readable media of any of paragraphs F-I, the operations further comprising: determining, based at least in part on the vehicle data, the object data, the probability distribution data, and a maneuver value of the object, a first metric representing a first distance or a first time of the vehicle associated with a tailgating state: determining, based at least in part on log data representing the vehicle, a second metric representing a second distance or a second time traveled by the vehicle; and determining, based at least in part on the first metric and the second metric, a relative number representing a relative tailgating state metric.

K: The one or more non-transitory computer-readable media of any of paragraphs F-J, the operations further comprising at least one of: determining that an angular difference between a first direction of travel of the vehicle and a second direction of travel of the object is less than a threshold angle: or determining that a difference between a predicted trajectory of the object and a planned trajectory of the object is less than a threshold difference.

L: The one or more non-transitory computer-readable media of any of paragraphs F-K, wherein determining the probability of the collision comprises: determining, based on the estimated deceleration profile of the object, a reaction distance: determining, based on a deceleration value of the object and an object velocity, an object deceleration distance: determining, based on a vehicle velocity of the vehicle and the vehicle maneuver value, a vehicle maneuver distance; and determining that a first sum of the reaction distance and the object deceleration distance is greater than a second sum of the vehicle maneuver distance and a distance between the vehicle and the object.

M: The one or more non-transitory computer-readable media of any of paragraphs F-L, wherein: the probability is a first probability associated with a first maneuver value: the first probability is one of a plurality of probabilities; and the first maneuver value is one of a plurality of maneuver values.

N: The one or more non-transitory computer-readable media of any of paragraphs F-M, wherein causing the vehicle to be controlled is further based on front end collision probability data.

O: The one or more non-transitory computer-readable media of any of paragraphs F-N, wherein causing the vehicle to be controlled comprises: causing the vehicle to brake based at least in part on a front end collision probability data being greater than a rear end collision probability data.

P: A system comprising: one or more processors; and one or more non-transitory computer-readable media storing instructions executable by the one or more processors, wherein the instructions, when executed, cause the system to perform operations comprising: receiving vehicle data representing a vehicle traversing an operational domain and object data representing an object traversing the operational domain proximate to the vehicle: determining, based at least in part on the vehicle data and the object data, that the object is in a region behind the vehicle: determining probability distribution data representing an estimated deceleration profile of the object: determining, based on the vehicle data, the object data, the probability distribution data, and a vehicle maneuver value, a probability of a collision between the vehicle and the object; and updating a parameter of a controller of the vehicle for operating the vehicle in the operational domain based on the probability of the collision.

Q: The system of paragraph P, the operations further comprising: determining a maneuver difference between a first maneuver of a first type of the vehicle and a second maneuver of the first type of the object; and determining a distance between the vehicle and the object, wherein the probability of the collision is further based on the maneuver difference and the distance.

R: The system of paragraph P or Q, wherein the probability distribution data includes a first reactivity probability and a second reactivity probability, the first reactivity probability being associated with a first reaction time and a first maneuver value, the second reactivity probability being associated with a second reaction time and a second maneuver value.

S: The system of any of paragraphs P-R, the operations further comprising: determining, based at least in part on the vehicle data, the object data, the probability distribution data, and a maneuver value of the object, a first metric representing a first distance or a first time of the vehicle associated with a tailgating state: determining, based at least in part on log data representing the vehicle, a second metric representing a second distance or a second time traveled by the vehicle; and determining, based at least in part on the first distance metric and the second distance metric, a relative number representing a relative tailgating state metric.

T: The system of any of paragraphs P-S, the operations further comprising at least one of: determining that an angular difference between a first direction of travel of the vehicle and a second direction of travel of the object is less than a threshold angle: or determining that a difference between a predicted trajectory of the object and a planned trajectory of the object is less than a threshold difference.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A method comprising:
receiving log data including vehicle data representing an autonomous vehicle traversing an operational domain and object data representing an external vehicle traversing the operational domain proximate to the autonomous vehicle;
determining, based at least in part on at least one of the vehicle data or map data, a region behind the autonomous vehicle;
determining that the external vehicle is located within the region;
determining a velocity difference between a first velocity of the autonomous vehicle and a second velocity of the external vehicle;
determining a distance between the autonomous vehicle and the external vehicle;
receiving a deceleration probability distribution representing a reaction time associated with the external vehicle braking and a vehicle deceleration associated with the external vehicle braking;
determining a deceleration value associated with the autonomous vehicle braking;
determining, based at least in part on the vehicle data, the object data, the deceleration probability distribution, and the deceleration value, a distance metric associating the external vehicle in a tailgating state with the autonomous vehicle;
determining a first distance traveled by the autonomous vehicle while the external vehicle is within a threshold distance of the autonomous vehicle;
determining, based at least in part on the distance metric and the first distance, a relative tailgating metric;
determining, based at least in part on the distance metric and the relative tailgating metric, a probability of the external vehicle colliding with a rear end of the autonomous vehicle;

updating a parameter of a controller of the autonomous vehicle for operating the autonomous vehicle in the operational domain based at least in part on the probability; and causing the autonomous vehicle to be controlled based at least in part on the parameter.

2. The method of claim 1, the distance metric including a first distance metric representing a percentage of miles travelled by the autonomous vehicle during which the autonomous vehicle was being tailgated by the external vehicle, the method further comprising:

determining, based at least in part on the log data, a second distance metric representing a second distance traveled by the autonomous vehicle; and determining, based at least in part on the first distance metric and the second distance metric, a relative number representing a relative tailgating state metric.

3. The method of claim 1, further comprising at least one of:

determining that an angular difference between a first direction of travel of the autonomous vehicle and a second direction of travel of the external vehicle is less than a threshold angle; or determining that a difference between a predicted trajectory of the external vehicle and a planned trajectory of the external vehicle is less than a threshold difference.

4. The method of claim 1, wherein determining the probability of the external vehicle colliding with the rear end of the autonomous vehicle comprises:

determining, based on the reaction time and the second velocity, a reaction distance;

determining, based on the vehicle deceleration and the second velocity, a vehicle deceleration distance;

determining, based on the first velocity and the deceleration value, an autonomous vehicle deceleration distance; and determining that a first sum of the reaction distance and the vehicle deceleration distance is greater than a second sum of the autonomous vehicle deceleration distance and the distance.

5. The method of claim 1, wherein:

the operational domain is one of a plurality of operational domains;

the probability is a first probability associated with a first deceleration value;

the first probability is one of a plurality of probabilities; and the first deceleration value is one of a plurality of deceleration values.

6. One or more non-transitory computer-readable media storing instructions that, when executed, cause one or more processors to perform operations comprising:

receiving vehicle data representing a vehicle traversing an operational domain and object data representing an object traversing the operational domain proximate to the vehicle;

determining, based at least in part on the vehicle data and the object data, that the object is in a region behind the vehicle;

determining a deceleration probability distribution representing an estimated deceleration profile of the object;

determining, based on the vehicle data, the object data, the deceleration probability distribution, and a vehicle maneuver value, a distance metric associating the object in a tailgating state with the vehicle;

determining a first distance traveled by the vehicle while the object is within a threshold distance of the vehicle;

determining, based at least in part on the distance metric and the first distance, a relative tailgating metric;

determining, based at least in part on the distance metric and the relative tailgating metric, a probability of a collision between the vehicle and the object; and modifying operation of the vehicle being controlled in the operational domain based on the probability of the collision.

7. The one or more non-transitory computer-readable media of claim 6, the operations further comprising:

determining a maneuver difference between a first maneuver of a first type of the vehicle and a second maneuver of the first type of the object; and determining a distance between the vehicle and the object, wherein the probability of the collision is further based on the maneuver difference and the distance.

8. The one or more non-transitory computer-readable media of claim 6, wherein the vehicle maneuver value is associated with the vehicle maneuvering.

9. The one or more non-transitory computer-readable media of claim 8, wherein the deceleration probability distribution includes a first reactivity probability and a second reactivity probability, the first reactivity probability being associated with a first reaction time and a first maneuver value, the second reactivity probability being associated with a second reaction time and a second maneuver value.

10. The one or more non-transitory computer-readable media of claim 6, the distance metric including a first distance metric representing a percentage of miles travelled by the vehicle during which the vehicle was being tailgated by the object, the operations further comprising:

determining, based at least in part on log data representing the vehicle, a second distance metric representing a second distance traveled by the vehicle; and determining, based at least in part on the first distance metric and the second distance metric, a relative number representing the relative tailgating metric.

11. The one or more non-transitory computer-readable media of claim 6, the operations further comprising at least one of:

determining that an angular difference between a first direction of travel of the vehicle and a second direction of travel of the object is less than a threshold angle; or determining that a difference between a predicted trajectory of the object and a planned trajectory of the object is less than a threshold difference.

12. The one or more non-transitory computer-readable media of claim 6, wherein determining the probability of the collision comprises:

determining, based on the estimated deceleration profile of the object, a reaction distance;

determining, based on a deceleration value of the object and an object velocity, an object deceleration distance;

determining, based on a vehicle velocity of the vehicle and the vehicle maneuver value, a vehicle maneuver distance; and determining that a first sum of the reaction distance and the object deceleration distance is greater than a second sum of the vehicle maneuver distance and a distance between the vehicle and the object.

13. The one or more non-transitory computer-readable media of claim 6, wherein:

the probability is a first probability associated with a first maneuver value;

the first probability is one of a plurality of probabilities; and the first maneuver value is one of a plurality of maneuver values.

14. The one or more non-transitory computer-readable media of claim 6, wherein causing the vehicle to be controlled is further based on front end collision probability data.

15. The one or more non-transitory computer-readable media of claim 6, wherein causing the vehicle to be controlled comprises:
  causing the vehicle to brake based at least in part on a front end collision probability data being greater than a rear end collision probability data.

16. A system comprising:
  one or more processors; and
  one or more non-transitory computer-readable media storing instructions executable by the one or more processors, wherein the instructions, when executed, cause the system to perform operations comprising:
    receiving vehicle data representing a vehicle traversing an operational domain and object data representing an object traversing the operational domain proximate to the vehicle;
    determining, based at least in part on the vehicle data and the object data, that the object is in a region behind the vehicle;
    determining a deceleration probability distribution representing an estimated deceleration profile of the object;
    determining, based on the vehicle data, the object data, the deceleration probability distribution, and a vehicle maneuver value, a distance metric associating the object in a tailgating state with the vehicle;
    determining a first distance traveled by the vehicle while the object is within a threshold distance of the vehicle;
    determining, based at least in part on the distance metric and the first distance, a relative tailgating metric;
    determining, based at least in part on the distance metric and the relative tailgating metric, a probability of a collision between the vehicle and the object; and
    causing the vehicle to be controlled in the operational domain based on the probability of the collision.

17. The system of claim 16, the operations further comprising:
  determining a maneuver difference between a first maneuver of a first type of the vehicle and a second maneuver of the first type of the object; and
  determining a distance between the vehicle and the object, wherein the probability of the collision is further based on the maneuver difference and the distance.

18. The system of claim 16, wherein the deceleration probability distribution includes a first reactivity probability and a second reactivity probability, the first reactivity probability being associated with a first reaction time and a first maneuver value, the second reactivity probability being associated with a second reaction time and a second maneuver value.

19. The system of claim 16, the distance metric including a first distance metric representing a percentage of miles travelled by the vehicle during which the vehicle was being tailgated by the object, the operations further comprising:
  determining, based at least in part on log data representing the vehicle, a second distance metric representing a second distance traveled by the vehicle; and
  determining, based at least in part on the first distance metric and the second distance metric, a relative number representing the relative tailgating metric.

20. The system of claim 16, the operations further comprising at least one of:
  determining that an angular difference between a first direction of travel of the vehicle and a second direction of travel of the object is less than a threshold angle; or
  determining that a difference between a predicted trajectory of the object and a planned trajectory of the object is less than a threshold difference.

\* \* \* \* \*